Figure 1:
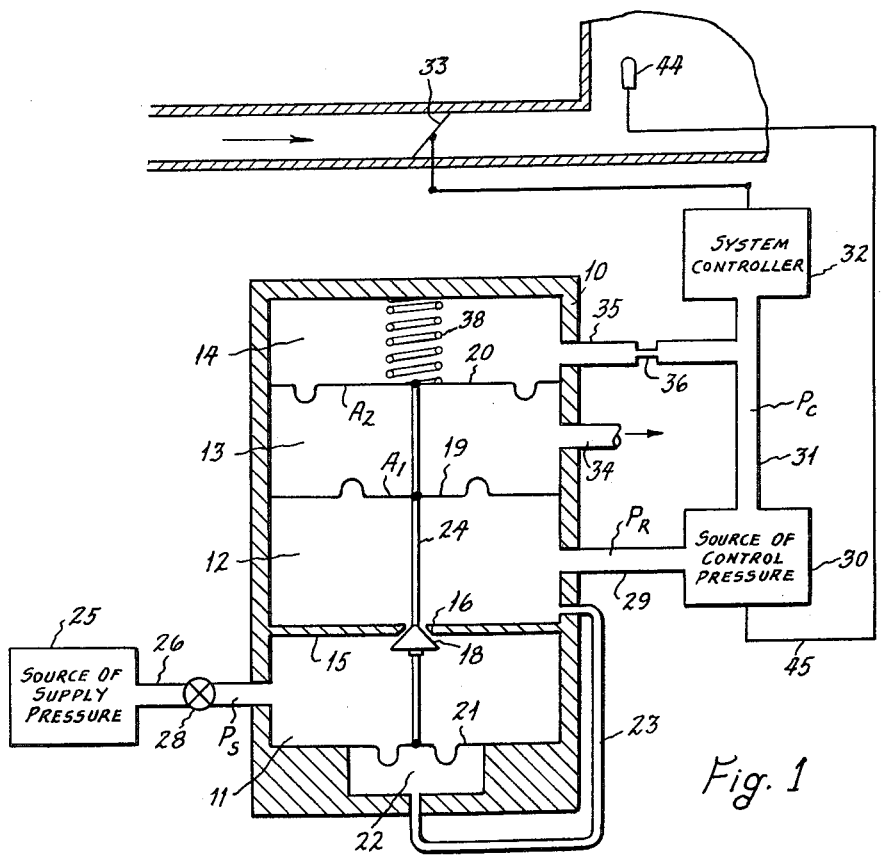

INVENTOR.
JOHN F. TAPLIN

United States Patent Office 2,918,074
Patented Dec. 22, 1959

2,918,074

DIFFERENTIAL PRESSURE-RESPONSIVE REGULATING MEANS

John F. Taplin, West Newton, Mass., assignor to Fairchild Engine and Airplane Corporation, Bay Shore, N.Y., a corporation of Maryland Application August 27, 1954, Serial No. 452,695

9 Claims. (Cl. 137—86)

The present invention relates to pneumatic and hydraulic control apparatus and, more particularly, to novel apparatus for improving the accuracy and stability of fluid control pressures in pneumatic and hydraulic control systems.

In one of the control methods currently used in pneumatic and hydraulic control systems, a fluid control pressure is derived by modifying a fluid pressure, which may be a constant reference pressure or one responsive to a condition of the fluid in one part of the system, as a function of a condition of the fluid in the same or another part of the system. The derived control pressure is used to vary at least one of the physical conditions of the system fluid. The fluid conditions referred to may be pressure, temperature, volume flow, etc. The fluid pressure signal from one part of the system may be modified by feeding it through a restriction into a conduit or chamber leading to a pressure responsive control means in the system, and then bleeding off a proportionate amount of the fluid pressure signal to a reference location in the system or to the atmosphere. It has been found that, when there are rapid or large fluctuations in the conditions of the fluid in parts of the system, the control pressure tends to be unstable and the system will hunt for a period of time with appreciable variations in control pressure. Further, it is sometimes found that, when the system attempts to compensate for the large or rapid fluctuations in the control pressure, it may reach a point of stability other than that which is required by the specifications for the system.

In accordance with the invention, a control mechanism, hereinafter known as a reset controller, may be inserted in the path of the fluid pressure signal. This reset controller may include an inlet chamber and an outlet chamber for the fluid pressure signal. The flow from the inlet chamber to the outlet chamber is then regulated as a function of the resultant control pressure and the regulated pressure to maintain the control pressure and the regulated outlet pressure in a fixed proportion. As a result of the fixed proportionality between the control pressure and the regulated pressure, the system returns or resets to a predetermined point of stability. Thus the reset controller derives its name from its ability to reset the flow, temperature or pressure characteristic of one section of the system to a zero error following large or rapid changes in the conditions of the system.

Figure 2:
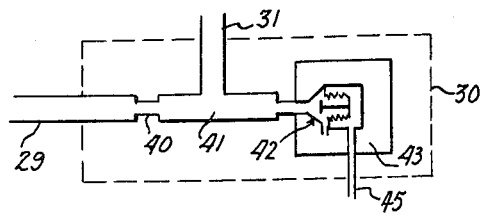

For a more complete understanding of the invention, reference may be made to the following detailed description taken in conjunction with the figures of the drawing, in which:

Figure 1 is a schematic representation of an exemplary embodiment of a reset controller in a fluid pressure control system, in accordance with the invention; and Fig. 2 is a schematic representation of an exemplary embodiment of the source of control pressure 30 in Fig. 1.

Referring now to Figure 1 of the drawing, the reset controller 10 comprises an inlet chamber 11, an outlet chamber 12, a reference chamber 13 and a load chamber 14. The inlet chamber 11 is separated from the outlet chamber 12 by a rigid partition 15. An aperture 16 forming a valve seat is centrally located in the rigid partition 15 to provide an opening between the inlet chamber 11 and the outlet chamber 12.

A conventional poppet valve disc 18 is disposed in the inlet chamber 11 and adapted to close on the valve seat 16 in the rigid partition 15.

The outlet chamber 12 is separated from the reference chamber 13 by a flexible diaphragm 19 having an effective area, designated as $A_1$. The reference chamber 13 is separated from the load chamber 14 by another flexible diaphragm 20, having an effective area $A_2$. The flexible diaphragms 19 and 20, the valve disc 18, and another flexible diaphragm 21, which separates the inlet chamber 11 from a chamber 22, and a passage 23 leading to the outlet chamber 12, are fixedly joined by a rod 24 serving as a valve stem for the valve disc 18. Since the diaphragms 19, 20 and 21, and the valve disc 18 are all fixedly joined to the valve stem 24, any movement of one will produce a similar movement of all the others.

A source 25 of fluid supply pressure $P_s$, which may be either independent of the controlled system and adapted to provide a substantially constant fluid pressure, as shown in Fig. 1, or dependent on the condition of the fluid in a part of the controlled system, is connected to the inlet chamber 11 through a conduit 26 having a flow control valve 28 therein. A conduit 29 connects the outlet chamber 12 to a control pressure source 30. The control pressure source 30 may be any suitable type of conventional control pressure developing apparatus. For example, as shown in Fig. 2, the pipe 29 feeds fluid from the outlet chamber through a restriction 40 into a chamber or conduit 41. The outlet chamber fluid is partially bled off through another variable restriction 42 to a reference location 43. The pressure within the chamber or conduit 41 is then available as a control pressure. The proportionality of the areas of the restrictions 40 and 42 may be varied as a function of a condition of a fluid within the controlled system, so that the control pressure may also be a function of the condition. For example, the restriction 42 is a thermostatically controlled variable restriction responsive to the temperature of the fluid, as determined by a thermometric control device 44, which may take any conventional form and which may control the restriction 42 in any suitable manner, for example, such as indicated by connection 45 and described in greater detail in co-pending application Serial No. 405,075, filed January 20, 1954, for "Control System," in the name of Ernest G. Le May, Jr., et. al., with a common assignee, now United States Patent No. 2,858,075.

The control pressure is fed over a conduit 31 to a system controller 32, which may take any suitable form, such as a means for operating a control valve 33 to regulate the physical conditions of the fluid in the controlled system. In the case where the restriction 42 is a thermostatically controlled variable restriction, the system controller 32 causes the valve 33 to control the flow of hot air through a conduit to an enclosure in response to variations in the temperature of the enclosure as indicated by thermometric control device 44.

The reference chamber 13 may open through a conduit 34 to the atmosphere or to some reference location in the controlled system.

The load chamber 14 is connected through a conduit 35, having a fixed restriction 36, to the conduit 31. A spring 38 is positioned in the load chamber 14 to bear upon the flexible diaphragm 20 and bias the valve disc 18 to an open position with respect to the valve seat 16.

In operation, when the flow control valve 28 is initially opened, fluid starts to flow through the conduit 26 into the inlet chamber 11 and causes the pressure in the inlet chamber 11 to rise from approximately zero gauge pressure, to the operating pressure $P_s$ of the supply source 25.

This buildup of pressure in the inlet chamber 11 would normally tend to close the valve disc 18 and the system would never get a chance to start. However, the spring 38 in the load chamber 14, bears upon the flexible diaphragm 20 and provides a bias force sufficient to hold the valve disc 18 in at least a partially open position, in the absence of other pressures in the load chamber 14 or in the outlet chamber 12. As a further safeguard that the system will be able to start to operate as the supply pressure $P_s$ builds up in the inlet chamber 11, it will be seen that the pressure in the inlet chamber 11 bears against the flexible diaphragm 21. Since at the start of operations there is zero gauge pressure in the outlet chamber 12, the buildup of pressure in the inlet chamber 11 causes the diaphragm 21 to move downwardly. Thus, the spring 38 and the flexible diaphragm 21 insure that the system will be able to start.

Since the valve disc 18 is partially open at the beginning of operations, the fluid from the source 25 of supply pressure $P_s$ will pass through the aperture or valve seat 16 into the outlet chamber 12 and thence through the conduit 29 to control the control pressure source 30. Since the fluid flow from the inlet chamber 11 to the outlet chamber 12 is under the control of the valve disc 18, the pressure in the outlet chamber 12 and the conduit 29 shall be designated as regulated pressure $P_r$.

The control pressure source 30 generates a control pressure $P_c$ which passes through the conduit 31 to the system controller 32 to operate the valve 33. The control pressure $P_c$ also passes through the conduit 35 and the restriction 36 into the load chamber 14. Thus pressure starts to build up in the load chamber 14. This buildup of pressure in the load chamber 14 is not instantaneous with the buildup of the control pressure $P_c$ in the conduit 31, since the fixed restriction 36 in the conduit 35 provides a time delay. The time delay, which is present in the buildup and in any subsequent variations in the control pressure $P_c$, is a function of the size of the fixed restriction 36 and of the volume of the load chamber 14.

The pressure $P_c$ in the load chamber 14 acts upon the effective area $A_2$ of the flexible diaphragm 20 to produce a downward force on the flexible diaphragm 20 and on the valve stem 24, that is directly proportional to the pressure $P_c$ times the effective area $A_2$. In a similar manner, the pressure $P_r$ in the outlet chamber 12 acts upon the effective area $A_1$ of the flexible diaphragm 19 to produce an upward force upon the flexible diaphragm 19 and the valve stem 24 proportional to the pressure $P_r$ times the effective area $A_1$.

In order to balance the force from back pressure on the valve disc 18, the effective area of the flexible diaphragm 21 is designed to be equal to to the effective area of the poppet valve disc 18. Since these areas are equal and since the pressure in the outlet chamber 12 is the same as that in the chamber 22, the effect of any back pressure is cancelled out.

As a practical matter, since the reset controller, in accordance with the invention, is normally to be used for relatively high control pressures, it will be obvious that the force exerted by the spring 38 upon the flexible disc 20 and the valve stem 24 will have a negligible effect upon the movement of the valve stem 24, when compared to the effect of the upward force from the pressure $P_r$ and the downward force from the pressure $P_c$. Further, since the reference chamber 13 is usually maintained at atmospheric pressure or at a relatively low reference value, the differential upwardly directed force on the larger diaphragm area $A_2$ of diaphragm 20 is negligible.

For the reset controller to be in equilibrium, the sum of the downward forces exerted upon the flexible diaphragms 19 and 20 must be equivalent to the sum of the upward forces exerted upon the flexible diaphragms 19 and 20 and the underside of the poppet valve 18. From the above discussion, it will be apparent that the primary effective forces are normally the regulated pressure $P_r$ and the control pressure $P_c$. Since the effective areas of the flexible diaphragms 19 and 20 are fixed, it will be equally apparent that the equilibrium condition can be reached only when the pressure ratio $P_r/P_c$ is equal to a constant, determined by the ratio of the effective areas of the flexible diaphragms 19 and 20, i.e. $k = A_2/A_1$.

It will be obvious that the particular effective areas $A_1$ and $A_2$ to be used in the reset controller 10 should be designed to fit the characteristics of the particular system in which it is to be used. For example, in a preferred embodiment of the system, it was found that the proportionality of the effective areas of the diaphragms $A_2/A_1$ should be equal to 1.0/0.7, thereby producing a stability ratio for the pressures $P_r/P_c$ of 1.43.

Since the reset controller functions to maintain a constant proportionality between the control pressure and the regulated pressure, it will be apparent that the other control factors which control the source 30 of control pressure $P_c$ in cooperation with the regulated pressure $P_r$ must also remain in fixed proportion to the pressures $P_r$ and $P_c$. For example, if, as previously mentioned, the control pressure $P_c$ was developed by feeding the regulated pressure signal $P_r$ through the restriction 40 into a chamber or conduit 41 and bleeding off a portion of the pressure signal through the variable restriction 42 to the reference location 43 as a function of the temperature of the fluid in the system, as determined by thermometric device 44, the reset controller will function to maintain the control pressure $P_c$ at such a value that the particular condition, in this case the temperature of the fluid in the enclosure, will be maintained substantially constant by operating the valve 33 to control the flow of hot air to the location of the device 44.

Thus, if the regulated pressure $P_r$ is fed into the control pressure source 30 through a fixed restriction, the reset controller can only be maintained in an equilibrium condition when the bleeder restriction is at one predetermined value. On the other hand, if the control pressure source 30 includes a variable restriction in the passage for the regulated pressure $P_r$, a variable bleeder restriction and a proportionality control responsive to a condition of the system fluid, the action of the reset controller 10 in attempting to remain at the predetermined equilibrium position will reset the control pressure $P_c$ to such a value that the proportionality control for the two variable restrictions is kept at a substantially constant value. As set forth in the aforementioned copending application Serial No. 405,075, now United States Patent No. 2,858,075, the variable restriction in the passage for the regulated pressure $P_r$, the variable bleeder restriction and the proportionality control may comprise a secondary flow controller which produces a control pressure $P_c$ that is a function of the proportionality of the areas of the variable restrictions and the regulated pressure $P_r$. The proportionality of the areas of the restrictions is controlled in response to the volume of flow through the system, which in turn is controlled in response to the control pressure $P_c$. As is the case in the aforementioned temperature control example, the reset controller functions to maintain a constant proportionality between $P_r$ and $P_c$. In each case equilibrium is achieved by maintaining the condition of the fluid at a constant predetermined value.

In order to eliminate the effect of variations or sharp fluctuations in the physical condition of the fluid in the system, the fixed restriction 36 in the conduit 35 is made very small, so that the time delay caused by the restriction 36 and the load chamber 14 is substantially longer than the other operating time delays in the system. For example, a time delay on the order of one minute is preferred. Since the fixed restriction 36 acts to smooth out variations and fluctuations, the reset controller 10 automatically compensates for these variations and fluctuations.

Thus the reset controller, in accordance with the invention, substantially increases the accuracy and stability of a fluid pressure control system by providing a reset action to accurately maintain the characteristics of the system at a predetermined substantially constant value.

It will be understood by those skilled in the art that the above-described embodiment is meant to be merely exemplary and that it is susceptible of modification and variation without departing from the spirit and scope of the invention. For example, the fixed restriction 36 may actually be located within the load chamber 14, as part of the aperture for the conduit 35. The invention, therefore, is deemed to be limited only by the appended claims.

I claim:

1. Fluid pressure control apparatus for controlling the physical condition of a fluid flowing through a system, comprising a source of fluid pressure, means for regulating said fluid pressure to provide a regulated fluid pressure, means for modifying said regulated fluid pressure as a function of a physical condition of the fluid flowing through said system to produce a fluid control pressure, means responsive to said fluid control pressure for varying said physical condition of said system fluid, and differential pressure-responsive means responsive to regulated fluid pressure and to said fluid control pressure for controlling said fluid pressure regulating means to maintain said regulated fluid pressure and said fluid control pressure in a fixed proportion, thereby maintaining said condition of said system fluid at a substantially constant value.

2. Apparatus for controlling a physical condition of a fluid in a system, comprising a fluid pressure source; means responsive to said fluid pressure and a condition of the fluid in the system for producing a control pressure to control said fluid condition; and regulating means connecting said fluid pressure source to said control pressure producing means including an inlet chamber connected to said fluid pressure source, and outlet chamber for receiving a regulated flow of fluid from said inlet chamber, said outlet chamber being connected to said control pressure producing means, and differential means responsive to the pressure of said fluid in said outlet chamber and to said control pressure for causing said regulating means to regulate the flow of fluid from said inlet chamber to said outlet chamber to maintain said fluid pressure in said outlet chamber and said control pressure in a fixed proportion.

3. Apparatus for controlling a physical condition of a fluid in a system, comprising a source of fluid pressure; fluid pressure regulating means having an inlet chamber connected to said source, an outlet chamber and valve means for regulating the flow of said fluid pressure from said inlet chamber to said outlet chamber to produce a regulated fluid pressure; means connected to said outlet chamber and responsive to said condition of said fluid in said system and to said regulated pressure for producing a control pressure to control said condition of said system fluid; and differential means responsive to said regulated pressure and to said control pressure for causing said valve means to maintain said regulated pressure and said control pressure in a fixed proportion.

4. A fluid pressure control for a system including a fluid pressure source and means responsive to said fluid pressure and to the physical conditions of the fluid in the system for producing a control pressure for varying said physical conditions, comprising an inlet chamber connected to said fluid pressure source, an outlet chamber for receiving a regulated flow of fluid from said inlet chamber, said outlet chamber being connected to said control pressure producing means, a valve means for controlling the flow of fluid from said inlet chamber to said outlet chamber, said outlet chamber having a flexible diaphragm responsive to the fluid pressure within said outlet chamber, a load chamber connected to the output of said control pressure producing means and having a flexible diaphragm responsive to said control pressure, and differential control means for said valve means differentially responsive to the pressures on said outlet chamber flexible diaphragm and said load chamber flexible diaphragm operable to maintain said outlet chamber pressure and said control pressure in a fixed proportion.

5. Fluid pressure control apparatus, comprising a source of fluid pressure; fluid pressure regulating means having an inlet chamber connected to said source, an outlet chamber, a load chamber, valve means for regulating the flow of fluid from said inlet chamber to said outlet chamber to produce a regulated fluid pressure, and differential control means responsive to the difference in pressure within said load chamber and said outlet chamber for controlling said valve means to maintain the pressures therein in a fixed proportion; means for producing a fluid control pressure connected to said outlet chamber; and means for introducing said fluid control pressure into said load chamber.

6. Fluid pressure control apparatus, comprising a source of fluid pressure; fluid pressure regulating means having an inlet chamber connected to said source, an outlet chamber, valve means for regulating the flow of fluid from said inlet chamber to said outlet chamber to produce a regulated fluid pressure, a reference chamber vented to a reference location, a load chamber, a first flexible diaphragm responsive to said regulated fluid pressure separating said outlet chamber and said reference chamber, a second flexible diaphragm separating said reference chamber and said load chamber, and differential means responsive to the movement of said first and second diaphragms for controlling said valve means; means for producing a fluid control pressure connected to said outlet chamber; and means for introducing said fluid control pressure into said load chamber.

7. Apparatus as described in claim 6, including fluid restrictive means positioned in said fluid control pressure introducing means.

8. Apparatus as described in claim 6, including a biasing spring in cooperation with one of said first and second diaphragms to bias said valve means to a partially open position.

9. Fluid pressure control apparatus for controlling the flow of fluid through a system, comprising a source of fluid under pressure; fluid pressure regulating means having an inlet chamber connected to said source, an outlet chamber, valve means for regulating the flow of said fluid from said inlet chamber to said outlet chamber to produce a regulated fluid pressure in said outlet chamber, a reference chamber vented to a reference location, a load chamber, a first flexible diaphragm separating said reference chamber and said outlet chamber, a second flexible diaphragm separating said reference chamber and said load chamber, differential control means responsive to the movement of said first and second diaphragms for controlling said valve means, and means for biasing said valve means to at least a partially open position; means connected to said outlet chamber and responsive to a condition of the fluid in said system for producing a fluid control pressure; means connected to said fluid control pressure producing means for controlling the flow of said system fluid; and means including a fluid restrictive means for introducing said fluid control pressure into said load chamber.

References Cited in the file of this patent

UNITED STATES PATENTS

| | | |
|---|---|---|
| 2,264,261 | Erbguth | Nov. 25, 1941 |
| 2,332,627 | Ergbuth | Oct. 26, 1943 |
| 2,388,457 | Zeigler | Nov. 6, 1945 |
| 2,517,051 | Swenson | Aug. 1, 1950 |
| 2,588,622 | Eckman | Mar. 11, 1952 |
| 2,628,086 | Cutler | Feb. 10, 1953 |
| 2,638,922 | Caldwell | May 19, 1953 |
| 2,651,317 | Heinz | Sept. 8, 1953 |
| 2,653,578 | Moore | Sept. 29, 1953 |

UNITED STATES PATENT OFFICE

CERTIFICATE OF CORRECTION

Patent No. 2,918,074            December 22, 1959

John F. Taplin

It is hereby certified that error appears in the printed specification of the above numbered patent requiring correction and that the said Letters Patent should read as corrected below.

Column 3, line 35, for "P" and the indistinct subscript following, read -- $P_c$ --; column 5, line 30, after "responsive to" insert -- said --; column 6, lines 41 and 42, after "differential" insert -- control --.

Signed and sealed this 12th day of July 1960.

(SEAL)
Attest:

KARL H. AXLINE
Attesting Officer

ROBERT C. WATSON
Commissioner of Patents